(12) United States Patent
Marken

(10) Patent No.: US 9,054,619 B2
(45) Date of Patent: Jun. 9, 2015

(54) SYSTEMS AND METHODS FOR BLACK STARTING A POWER GRID USING A SELF-STARTING SYNCHRONOUS CONDENSER

(75) Inventor: Paul E. Marken, Columbia City, IN (US)

(73) Assignee: General Electric Company, Schenectady, NY (US)

( * ) Notice: Subject to any disclaimer, the term of this patent is extended or adjusted under 35 U.S.C. 154(b) by 615 days.

(21) Appl. No.: 13/408,633

(22) Filed: Feb. 29, 2012

(65) Prior Publication Data

US 2013/0221877 A1    Aug. 29, 2013

(51) Int. Cl.
*H02P 1/00* (2006.01)
*H02P 1/46* (2006.01)
*H02P 9/08* (2006.01)
*H02J 9/08* (2006.01)

(52) U.S. Cl.
CPC ... *H02P 1/46* (2013.01); *H02J 9/08* (2013.01); *H02P 9/08* (2013.01)

(58) Field of Classification Search
USPC .......................................... 318/139; 320/137
See application file for complete search history.

(56) References Cited

U.S. PATENT DOCUMENTS

| | | | |
|---|---|---|---|
| 3,663,948 A | 5/1972 | Nagae et al. | |
| 6,093,975 A | 7/2000 | Peticolas | |
| 6,559,559 B2 * | 5/2003 | Cratty | 307/64 |
| 6,670,721 B2 * | 12/2003 | Lof et al. | 290/44 |
| 8,384,319 B2 * | 2/2013 | Marken et al. | 318/280 |
| 8,400,090 B2 * | 3/2013 | Marcinkiewicz et al. | 318/438 |
| 2009/0096212 A1 | 4/2009 | Turner et al. | |
| 2009/0309421 A1 * | 12/2009 | Angquist et al. | 307/46 |
| 2010/0328978 A1 * | 12/2010 | Marken | 363/171 |
| 2011/0291416 A1 * | 12/2011 | Edenfeld | 290/44 |
| 2013/0300116 A1 * | 11/2013 | Egedal et al. | 290/44 |

* cited by examiner

*Primary Examiner* — Kawing Chan
(74) *Attorney, Agent, or Firm* — Sutherland Asbill & Brennan LLP

(57) ABSTRACT

Systems and methods for black starting a power grid are described. A battery-powered configuration including, but not limited to, a motor, drive, and batteries can be coupled to a condenser which is coupled to a power grid. The drive can draw power from the batteries and use the power to accelerate the motor. As the motor accelerates, the condenser can accelerate by virtue of a shaft coupling the motor to the condenser. Upon the condenser reaching a certain speed or operational capacity, an inverter can de-block from a power distribution line and allow power to enter the power grid. In certain embodiments, a control device such as a circuit or computing device can be used to facilitate the black start of the power grid.

20 Claims, 3 Drawing Sheets

SYSTEMS AND METHODS FOR BLACK STARTING A POWER GRID USING A SELF-STARTING SYNCHRONOUS CONDENSER

TECHNICAL FIELD

Embodiments of the invention relate generally to electrical power distribution and more particularly to using a battery-powered condenser to black start a power grid.

BACKGROUND OF THE INVENTION

Various planned or unplanned events can cause a power grid to lose power. In many situations, a synchronous condenser can be used to help black start the power grid or restore power to it after an outage. Providing power to the condenser, however, can be problematic, particularly when a direct current (DC) inverter is connected to the power grid. The inverter can supply power (watts) but because it can require reactive power (vars), it may be unable by itself to assist with black starting the power grid. For example, the power grid itself cannot be used to power the condenser in an outage situation. Instead, turbines, engines, or other prime movers may be used to power the condenser. Such devices, however, are oftentimes dedicated solely to the purpose of powering the condenser, which can add inefficiency, complexity, and cost to existing electrical power systems.

BRIEF DESCRIPTION OF THE INVENTION

Some or all of the above needs and/or problems may be addressed by certain embodiments of the invention. Certain embodiments may include systems and methods for starting a power grid. According to one embodiment, there is disclosed a system for starting a grid coupled to a condenser. The system includes an alternating current (AC) motor coupled to the condenser, a battery configured to power the motor, and a circuit operable to receive a signal to start the grid, initiate operation of the condenser coupled to the grid via the AC motor when the start is requested, and facilitate charging the battery via the AC motor when the start is complete.

According to another embodiment, there is disclosed a method for starting a grid coupled to a condenser. The method includes coupling an AC motor to the condenser, coupling, to the AC motor, a battery configured to power the AC motor, powering the motor by the battery, and initiating operation of the condenser coupled to the grid via the AC motor when a start is requested.

According to a further embodiment, there is disclosed a method for starting a grid. The method includes determining whether a start is requested, powering an AC motor by a battery, initiating operation of a condenser coupled to the grid via the AC motor when the start is requested, and charging the battery via the AC motor when the start is complete.

Other embodiments, systems, methods, aspects, and features of the invention will become apparent to those skilled in the art from the following detailed description, the accompanying drawings, and the appended claims.

DETAILED DESCRIPTION OF THE INVENTION

Illustrative embodiments will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements.

Illustrative embodiments of the invention are directed to, among other things, black starting a power grid. "Black starting" can be referred to as the process of restoring a power grid to operation without relying on an external electric power transmission network, such as that which can rely on a power plant generator. "Black starting" may also be referred to herein more generally as "starting" the power grid. In the absence of an external power source, certain devices can be coupled to the power grid to black start the power grid. Such devices can be coupled to a condenser to assist the condenser in black starting the power grid. For example, battery power can be supplied via a coupling of batteries, a drive, and a motor to the condenser. The drive can draw power from a battery and use the power to accelerate the motor, which can in turn accelerate the condenser by virtue of the motor being connected to the condenser via a shaft. Upon the condenser reaching a certain speed, such as half-speed, an inverter coupled to a direct current, high-voltage (HVDC) power distribution system can de-block and allow power to begin moving into the power grid. The HVDC system can begin to accelerate the condenser and stabilize the power grid to a steady state condition, for example, such that loads can be added to the power grid. The configuration used to provide power to the condenser can also be used to charge the batteries so that they can provide power on subsequent black starts. In one embodiment, recharging the batteries can occur after the power grid has been restored to a steady state condition. In certain embodiments, a control device can be used to facilitate black starting the power grid. For example, the control device can receive a signal to start the power grid, initiate operation of the condenser via the motor when the start is requested, and charge the batteries.

The technical effects of certain embodiments herein can include lower maintenance and operating costs in the way that dedicated, expensive equipment such as a diesel engine or gas turbine may not be required to provide power to black start a power grid. Another technical effect can include economical use of energy in the way that a battery can be used for relatively brief periods of time, e.g., less than five minutes in certain embodiments, to assist in black starting a power grid. Furthermore, the described battery-powered configuration can provide a simpler solution than that provided by a dedicated diesel or gas turbine, for example.

Figure 1:
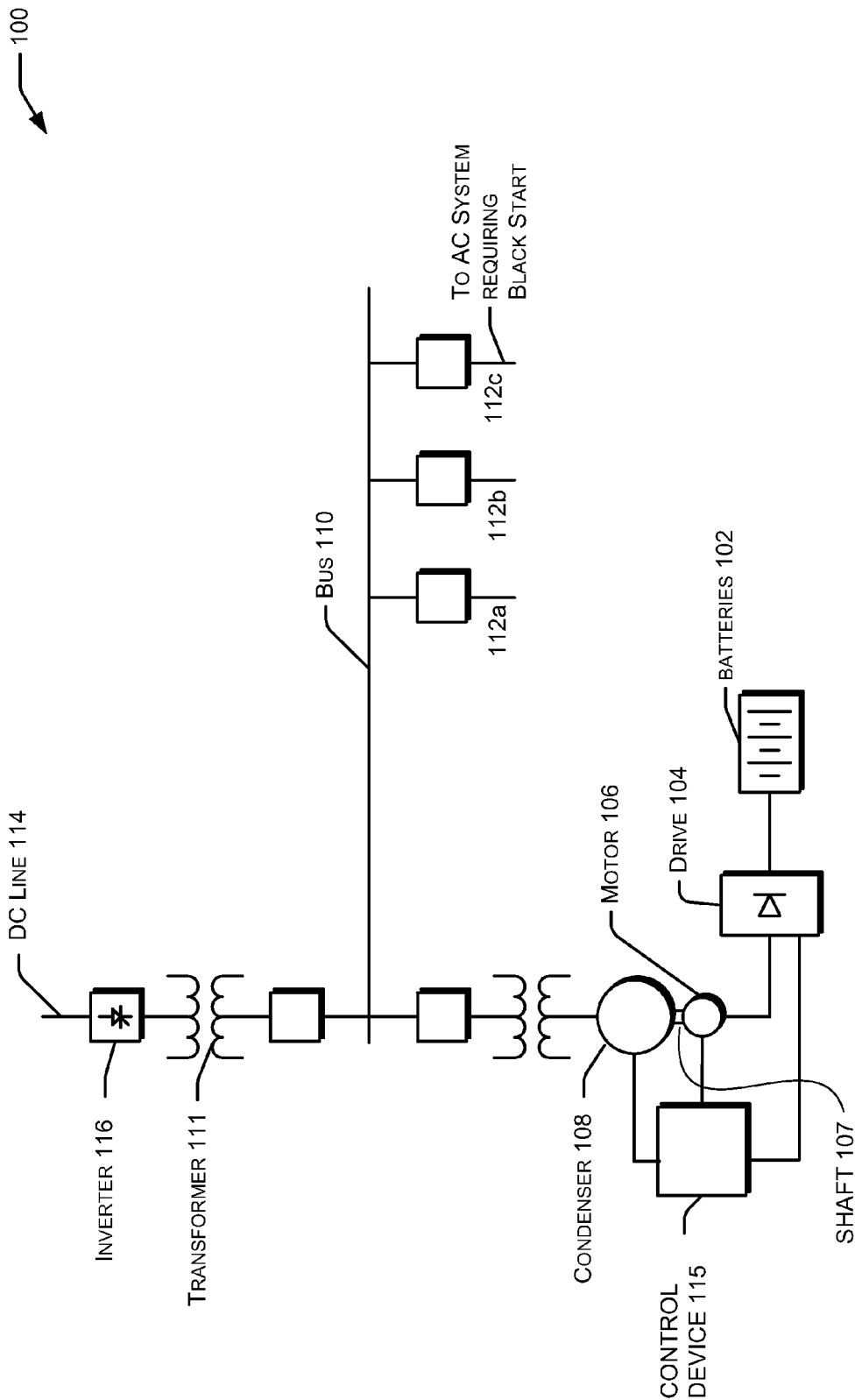
FIG. 1 is an illustration of an exemplary configuration for black starting a power grid with an inverter using a battery-powered condenser, according to one embodiment.

FIG. 1 depicts an illustration of a power distribution system 100, such as an HVDC power distribution system. In one aspect of an embodiment, the HVDC system can be a thyristor-based HVDC system. The power distribution system 100 can include, but is not limited to, a bus 110 for distributing electric power to the power grid requiring a black start via one or more leads 112a, 112b, and 112c. In one embodiment, the bus 110 can be AC bus. The power distribution system 100 can also include an inverter 116, (e.g., an HVDC inverter). The inverter 116 can be coupled to DC line 114 and can de-block from DC line 114 to allow power to enter into the power grid upon the occurrence of certain events, such as a condenser 108 reaching at least half-speed.

The condenser 108 can be coupled to the power grid. In one aspect of an embodiment, the condenser 108 can be a synchronous condenser. As shown in FIG. 1, the synchronous condenser 108 can be in communication with bus 110, DC lines 114, one or more transformers 111, or other electrical power equipment that can be used to provide power in an electrical power network. The synchronous condenser 108 can provide reactive power needs by acting either as a synchronization or source of reactive power to support the power grid's voltage requirements or provide a certain voltage to enable black starting of the grid. In one embodiment, the HVDC system can supply real power (MW) to the synchronous condenser 108 while the synchronous condenser 108 can supply reactive power (MVAR), short circuit strength, and voltage support to the HVDC system. In one embodiment, the synchronous condenser 108 can provide power commensurate with about at least half-speed, or 40-50% of its operational capacity. Upon reaching this speed or capacity in one embodiment, the power distribution system 100 can begin accelerating the condenser 108 to stabilize the power grid. Various types and sizes of synchronous condensers can be used in various embodiments. Such condensers can also be sized appropriately for use with a motor 106 and a drive 104, for example, to enable a successful black start of a power grid.

The HVDC power distribution network 100 can also include various devices configured to black start the power grid. Such devices can include, but are not limited to, batteries 102, a drive 104, a motor 106, and a control device 115. In one embodiment, the motor 106 and the batteries 102 can be coupled to the drive 104. The batteries 102 can be configured to power the motor 106 via the drive 104 when the black start is requested, in one embodiment. For example, the drive 104 can draw power from the batteries 102 to accelerate the motor 106, which can in turn accelerate the condenser 108 via a connection to the condenser 108 via shaft 107. Thus, as the drive 104 accelerates the motor 106 around the shaft 107, the condenser 108 can subsequently accelerate. In one embodiment, the motor 106 can accelerate the condenser 108 to at least when the black start request occurs. In one aspect of the embodiment, half-speed can represent at least 40-50% of operational capacity of the condenser. Such a speed or capacity of the condenser 108 can be considered the point at which the condenser 108 generates sufficient reactive power to enable the HVDC power distribution network 100 to begin accelerating the condenser 108 and complete the black start of the power grid. Various other speeds and percentages of operational capacity can accomplish a successful black start in other embodiments.

In addition to accelerating the condenser 108, the motor 106 can also act as an induction generator which the drive 104 can use to recharge the batteries 102. In a particular aspect of an embodiment, the motor 106 can be configured to recharge batteries 102 via the drive 104 when the black start is complete. The configuration shown in FIG. 1 can also include a clutch that can be used to decouple or disconnect the AC motor 106 from the shaft 107. In some embodiments, however, the motor 106 can remain coupled to the shaft 107 and freewheel in instances where relatively high inertia may be desired, for example.

The motor 106 can be coupled to the condenser 108 to accelerate the condenser 108. Certain embodiments herein can include a motor 106 that is an AC motor. In one embodiment, the motor 106 can be a three-phase AC pony motor rated for variable frequency duty. Such a rating can correspond to the drive 104 which the motor 106 can use to draw power from batteries 102. The motor 106 may also be sized in accordance with the condenser 108 in some embodiments. In other embodiments, the motor 106 can be a direct current (DC) motor that draws power from a DC power source.

The motor 106 can be coupled to various types of the drives 104 to draw power from batteries 102. In one embodiment, the drive 104 can include a four-quadrant AC drive. In one aspect of the embodiment, the four-quadrant AC drive can include a variable frequency drive. In another aspect, the four-quadrant AC drive can include an insulated-gate, bipolar transistor (IGBT) four-quadrant AC drive. Each of these drives can control the rotational speed of the motor 106 by controlling the frequency of the electrical power supplied to the motor 106. In this way, the drives 104 can facilitate control of the power supply from batteries 102 to the motor 106, as well as facilitate control of the power supply from the motor 106 to the batteries 102 to recharge the batteries 102.

The batteries 102 can be configured to power the motor 106. The batteries 102 can include, but are not limited to, Li-Ion, Ni-Cad, Ni-MH, or other battery technologies that may be suitable for shorter durations of power. For example, in one embodiment, batteries 102 can bring the condenser 108 to at least half speed within about five minutes of the drive 104 drawing power from batteries 102. Power can also be provided by various other bi-directional power sources such as capacitors or capacitor banks, in some embodiments.

An inverter 116, such as an HVDC inverter, can be used to convert direct current to three-phase alternating current, and vice versa. In one embodiment, the inverter 116 can be configured to de-block the power grid from a direct current line, e.g., DC line 114, and provide power to the grid after the condenser 108 reaches at least half-speed or at least 40-50% operational capacity. In this way, the HVDC inverter can control the flow of power into the power grid.

A control device 115 can facilitate a black start of the power grid, in one embodiment. The control device 115 can be coupled to the power distribution system 100, for example to the batteries 102, drive 104, motor 106, and condenser 108 as shown in FIG. 1. In one embodiment, facilitation of a black start by the control device 115 can include receiving a signal (i.e., a request) to black start the power grid, initiating operation of the condenser 108 coupled to the power grid via the AC motor 106 when the black start is requested, and facilitating the charging of the batteries via the AC motor 106 when the black start is complete.

Exemplary control devices 115 can include, but are not limited to, one or more circuits, computing devices, or generally processor-driven devices that are capable of communicating with a memory that stores computer-executable instructions to facilitate a black start as described in certain embodiments herein. A processor in a computing device may be implemented as appropriate in hardware, software, firmware, or combinations thereof. Software or firmware implementations of the processor may include computer-executable or machine-executable instructions written in any suitable programming language to facilitate black starting the power grid. Examples of computing devices may include a mainframe, personal computer, web server, mobile device, or any processor-based device capable of executing instructions to facilitate the black start.

A memory in a computing device may store program instructions that are loadable and executable on the processor, as well as data generated during the execution of these programs. Depending on the configuration and type of computing device, a memory may be volatile (such as random access memory (RAM)) and/or non-volatile (such as read-only memory (ROM), flash memory, etc.). The computing device may also include additional removable storage, and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

The computing device can also include one or more communication connections that can allow the computing device to communicate with various other devices, such as sensors that can be configured to collect measurement data regarding the operation of the condenser 108. The connection between the computing device and other devices can be a wired or wireless connection, according to various embodiments.

The control device 115 can receive a signal to black start the power grid. In one embodiment, the signal can be received from one or more sensors that can be configured to monitor operation of the synchronous condenser 108 to, for example, identify an interruption in power supply to the power grid. Such an interruption can include a complete power outage which may require black starting the power grid to restore power. To determine whether an outage has occurred, the control device 115 can analyze measurement data collected by the one or more sensors. In some embodiments, the control device 115 can also receive an automated signal (e.g., via a software monitoring tool running on a computing device) or a manual signal (e.g., received from an operator who desires to issue an on-demand black start of the power grid).

The control device 115 can also initiate operation of the condenser 108. For example, in one embodiment, the control device 115 can cause the AC motor 106 to accelerate using batteries 102, which in turn can cause the condenser 108 to accelerate by virtue of the shaft connection 107 between the two devices. The control device 115 can determine or calculate an amount of power to supply to the motor 106 to attain a certain acceleration, e.g., at least half-speed in certain embodiments. The control device 115 can also facilitate charging the batteries 102. In one embodiment, batteries 102 can be charged when the black start is complete. The circuit 115 can notify the control device 115 of such completion, at which time the drive 104 can use the AC motor 106 as an induction generator for recharging the batteries 102. The control device 115 can also determine an amount of power to supply to the batteries 102 from the AC motor 106 acting as an induction generator.

Figure 2:
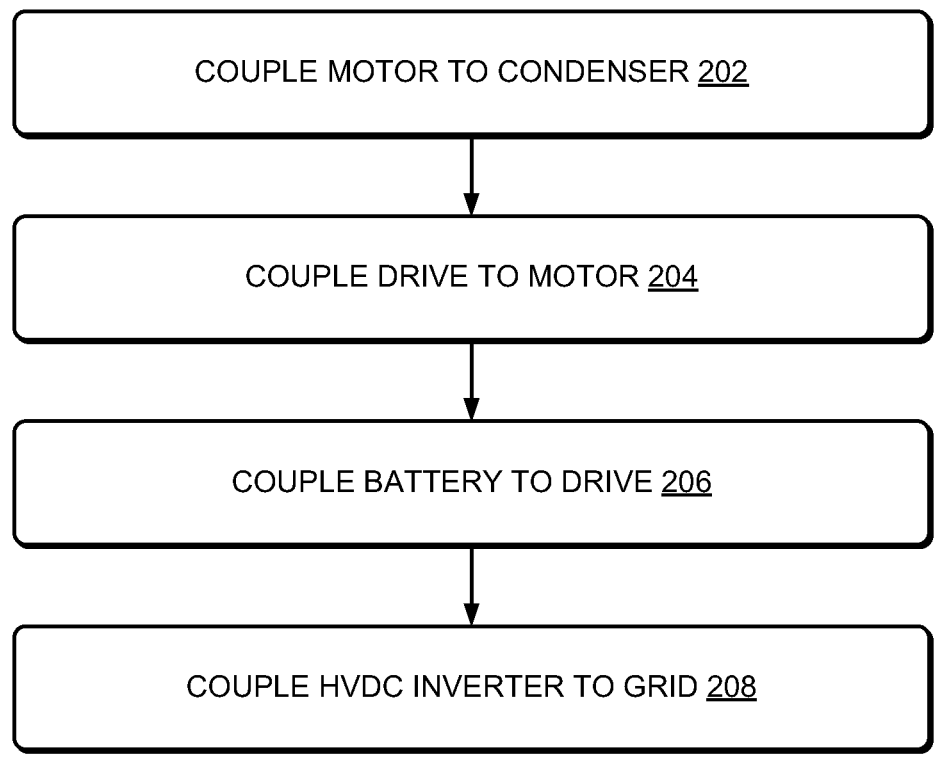
FIG. 2 is a flow diagram illustrating the details of configuring a system for black starting a power grid, according to one embodiment.

FIG. 2 depicts an exemplary flow diagram for configuring a power distribution network for black starting a power grid, according to one embodiment. The order in which the operations are described is not intended to be construed as a limitation, and any number of the described operations can be combined in any order and/or in parallel to implement the process. At block 202, the motor, e.g., motor 106, can be coupled to the condenser, e.g., condenser 108. As noted above, the motor can be coupled to the condenser via a shaft, e.g., shaft 107. Such a coupling of the condenser and the motor can allow the condenser to accelerate as the motor accelerates. One or more batteries, e.g., batteries 102, configured to power the motor can be coupled to the drive, e.g., drive 104, at block 206. The drive can be coupled to the motor at block 204. Thus, in one aspect of an embodiment, the motor and the battery can be coupled to the drive. The drive can draw power from the batteries and use the power to accelerate the motor. At block 208, the power grid can receive an inverter, e.g., inverter 116, coupled to the power grid. The inverter can include an HVDC inverter that can de-block from a direct current line to allow power to enter the grid when, for example, the condenser accelerates to at least half-speed or 40-50% operational capacity. The acceleration can cause the condenser to spin and as a result provide reactive power and voltage regulation, thereby allowing the inverter to function according to certain embodiments herein.

Figure 3:
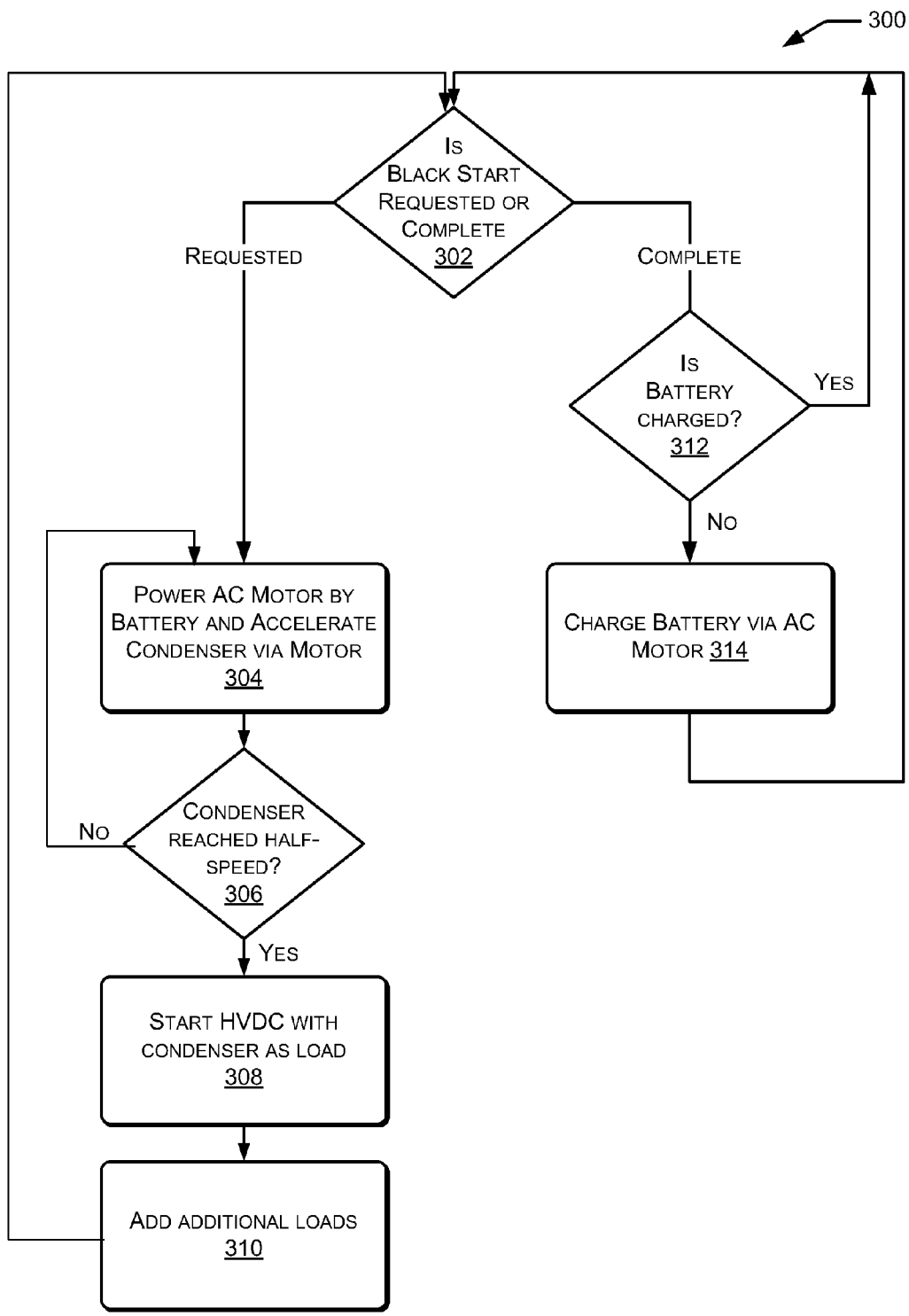
FIG. 3 is a flow diagram illustrating the details of black starting a power grid, according to one embodiment.

FIG. 3 is an exemplary flow diagram illustrating details of a method for black starting a power grid, according to one embodiment. In one example, a control device such as control device 115 can be used to manage or control the operations of process 300. The process 300 is illustrated as a logical flow diagram, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In one particular implementation, a power grid requiring a black start can be configured as illustrated in FIGS. 1 and 2. The process 300 can begin at decision block 302, where a determination can be made whether a black start has been requested or completed. Such a determination can be made in various ways. In one embodiment, a control device, e.g., control device 115, can access and update an indicator in a memory of the control device, for example, to indicate whether a black start has been requested or completed. Such an indicator can be updated based on measurement data received from one or more sensors, in one embodiment. The indicator can also be updated based on an automated or manual request received from a computing device, for example. Whether a black start has been completed can be based on the occurrence of certain events, such as a reading of voltage levels in the power grid or the speed or operational capacity of the condenser after the power distribution system has accelerated the condenser, in one embodiment. Various other techniques or indicators implemented in hardware or software, for example, can be used to indicate that a black start has been requested or completed.

Upon a black start being requested, the motor can be powered via batteries at block 304. Powering the motor in such a way can initiate operation of a condenser coupled to the power grid. In one embodiment, the motor can be configured to initiate operation of the condenser to at least half-speed. In one aspect of the embodiment, half-speed can mean that an operational capacity of at least 40-50% for the condenser has been reached. Such an operational capacity can be sufficient to start an HVDC power distribution system, in one embodiment. Various other speeds of the AC motor and capacities of the condenser can be used to start an HVDC power distribution system and subsequently black start a power grid in other embodiments.

At decision block 306, a determination can be made whether at least half-speed of the condenser has been reached. If such a speed of the condenser has not been reached, the AC motor can continue to be powered via batteries at block 304 until the speed is reached. If the desired speed of the condenser has been reached, the HVDC power distribution system can be started with the condenser as a load, at block 308. In one embodiment, the condenser can be the only load upon starting the HVDC power distribution system. In another embodiment, the condenser, motor, drive, and batteries can be the only loads upon starting the HVDC power distribution system. When at least half-speed of the condenser is reached, an HVDC inverter can de-block and allow power to begin moving into the power grid. At such a speed the HVDC power distribution system can accelerate the condenser, instead of or in addition to the motor. The condenser can provide reactive power and voltage support for the HVDC power distribution system to stabilize the power grid so that additional loads can be added to the power grid at block 310. In one embodiment, the ability to successfully add loads in addition to the condenser can represent a successful black start of the power grid.

If it is determined that a black start has been completed at decision block 304, a determination can be made whether the batteries from which power was drawn to accelerate the condenser have been charged, at block 312. If the batteries have been charged, processing can return to decision block 302 where a determination can again be made to determine whether a black start has been requested or completed. If the batteries have not been charged, they can be charged via the motor at block 314, in one embodiment. According to this embodiment, a drive, e.g., drive 104, can recharge the batteries so that they can be used to black start the power grid on subsequent black start requests.

That which is claimed:

1. A system for starting a power grid, the system comprising:
    an alternating current (AC) motor coupled to a condenser, the condenser coupled to the power grid;
    an inverter coupled to the power grid;
    a battery configured to power the AC motor; and
    a circuit operable to:
        receive, from one or more sensors, a signal to start the power grid, the signal comprising an indication of a power outage in the power grid;
        initiate, based at least in part on the signal, powering the AC motor by the battery to accelerate the condenser to a predetermined acceleration speed via a shaft coupled between the AC motor and the condenser, wherein when the predetermined acceleration speed is reached, the inverter de-blocks to allow power to enter the power grid for supply to the condenser as a load; and
        facilitate charging the battery via the AC motor when the start is complete.

2. The system of claim 1, wherein the condenser comprises a synchronous condenser.

3. The system of claim 1, further comprising a drive, wherein the AC motor and the battery are coupled to the drive, and wherein the battery is configured to power the motor via the drive when the signal to start the power grid is received.

4. The system of claim 3, wherein the drive comprises a four-quadrant AC drive.

5. The system of claim 4, wherein the four-quadrant AC drive comprises a variable frequency drive.

6. The system of claim 5, wherein the four-quadrant AC drive comprises an insulated-gate, bipolar transistor (IGBT), four-quadrant AC drive.

7. The system of claim 1, wherein the predetermined acceleration speed is at least half-speed of the condenser, wherein the at least half-speed comprises at least 40-50% of operational capacity of the condenser.

8. The system of claim 7, wherein the inverter comprises a high-voltage, direct current (HVDC) inverter.

9. The system of claim 1, wherein the power comprises first power, the circuit further operable to:
    determine an amount of second power to supply to the AC motor to reach the predetermined acceleration speed of the condenser; and
    provide the amount of second power to the AC motor, wherein the providing causes the AC motor to accelerate the condenser to the predetermined acceleration speed.

10. A method for starting a power grid, the method comprising:
    coupling an alternating current (AC) motor to a condenser;
    coupling the condenser and an inverter to the power grid;
    coupling a battery to the AC motor, the battery configured to power the AC motor;
    receiving, from one or more sensors, a signal to start the power grid, the signal comprising an indication of a power outage in the power grid; and
    initiating, based at least in part on the signal, powering the motor by the battery to accelerate the condenser to a predetermined acceleration speed, wherein when the predetermined acceleration speed is reached, the inverter de-blocks to allow power to enter the power grid for supply to the condenser as a load.

11. The method of claim 10, further comprising coupling a drive to the AC motor and the battery, wherein the battery is configured to power the AC motor via the drive when the signal to start the power grid is received.

12. The method of claim 11, wherein the drive comprises a four-quadrant AC drive.

13. The method of claim 12, wherein the four-quadrant AC drive comprises a variable frequency drive.

14. The method of claim 13, wherein the four-quadrant AC drive comprises an insulated-gate, bipolar transistor (IGBT), four-quadrant AC drive.

15. The method of claim 11, wherein the predetermined acceleration speed is at least half-speed of the condenser, wherein the at least half-speed comprises at least 40-50% of operational capacity of the condenser.

16. The method of claim 15, wherein the inverter comprises a high-voltage, direct current (HVDC) inverter.

17. The method of claim 10, wherein the AC motor is configured to recharge the battery via a drive coupled to the AC motor when the start is complete.

18. A method for starting a power grid, the method comprising:
    receiving, from one or more sensors, a signal to start the power grid, the signal comprising an indication of a power outage in the power grid;
    initiating, based at least in part on the signal, powering an AC motor by a battery to accelerate a condenser to a predetermined acceleration speed via a shaft coupled between the AC motor and the condenser, the condenser coupled to the power grid, wherein when the predetermined acceleration speed is reached, an inverter coupled to the power grid de-blocks to allow power to enter the power grid for supply to the condenser as a load; and
    charging the battery via the AC motor when the start is complete.

19. The method of claim 18, wherein the powering of the AC motor and the charging of the battery comprises operating a drive coupled to the AC motor and the battery.

20. The method of claim 18, wherein the predetermined acceleration speed if at least half-speed of the condenser, wherein the at least half-speed comprises at least 40-50% of operational capacity of the condenser.

* * * * *